Patented June 16, 1931

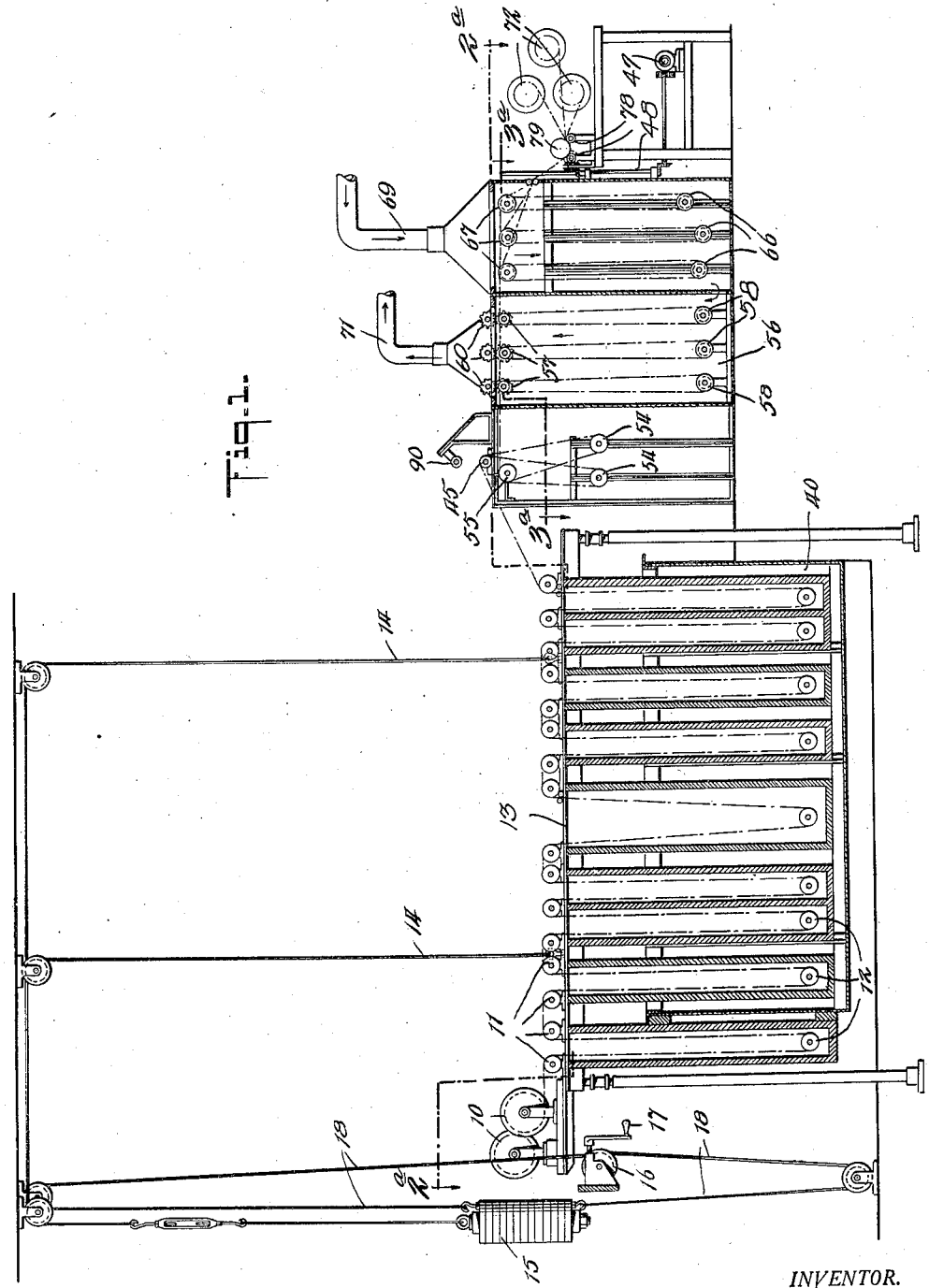

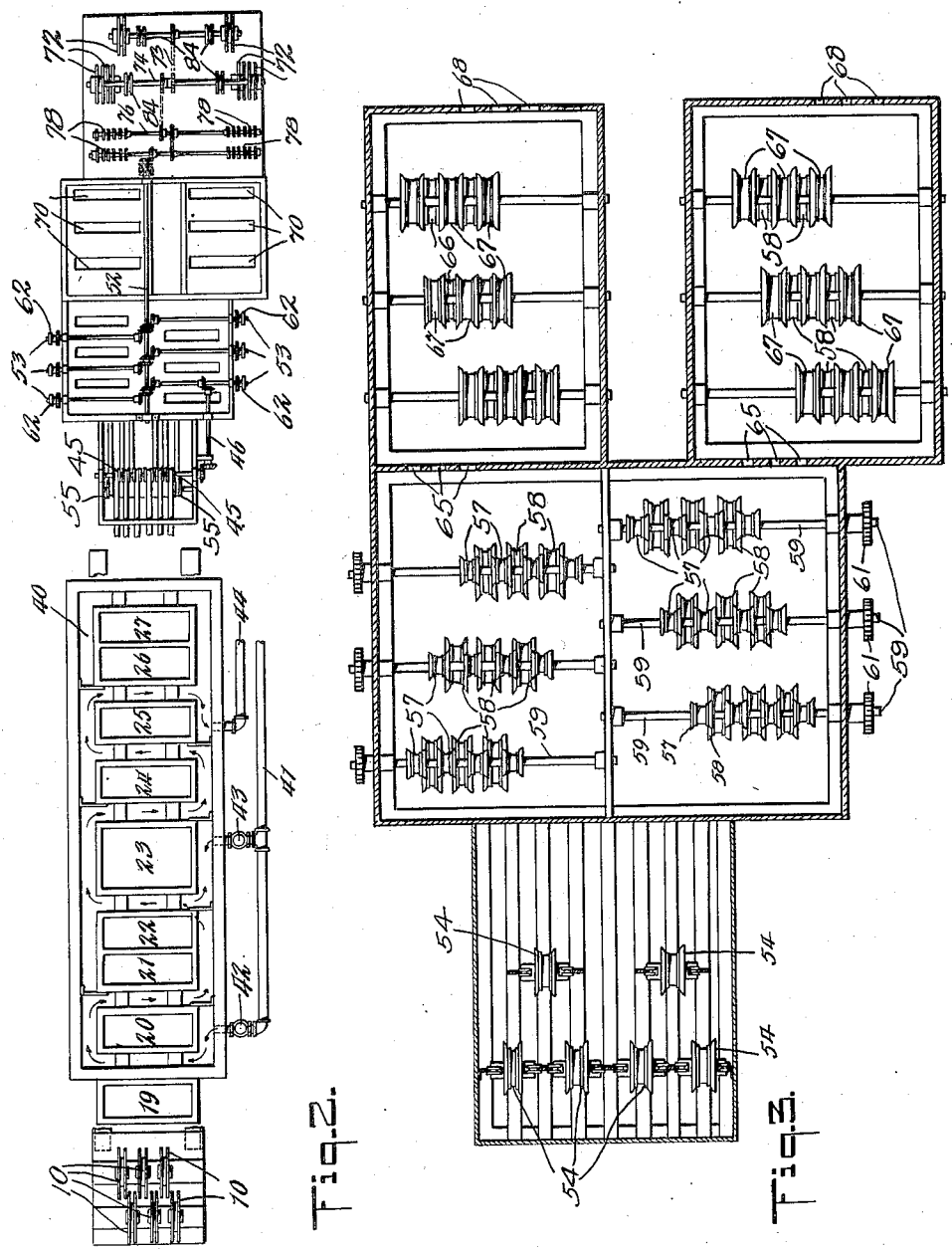

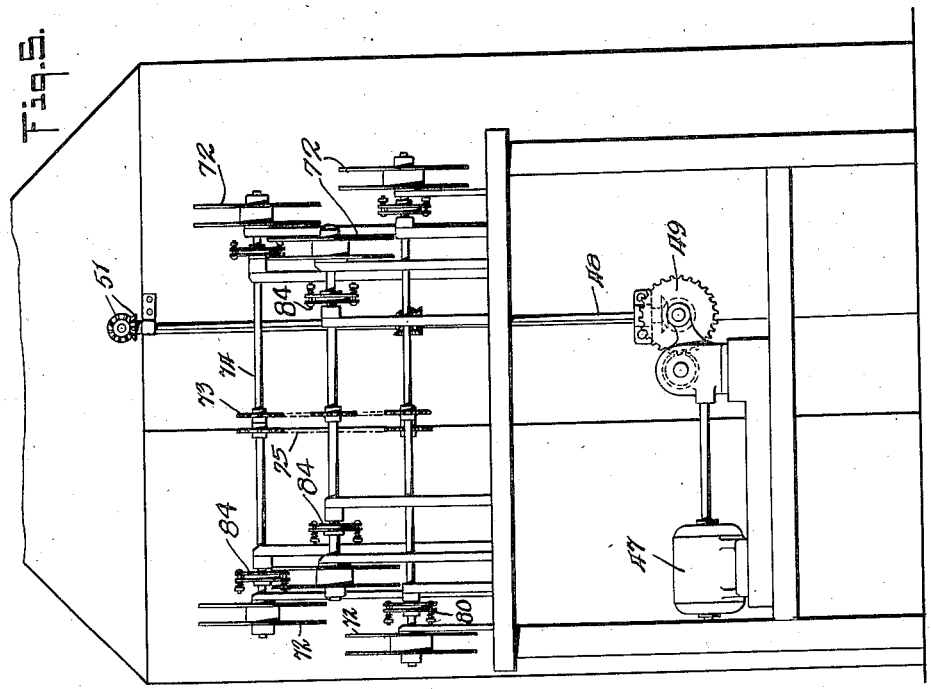
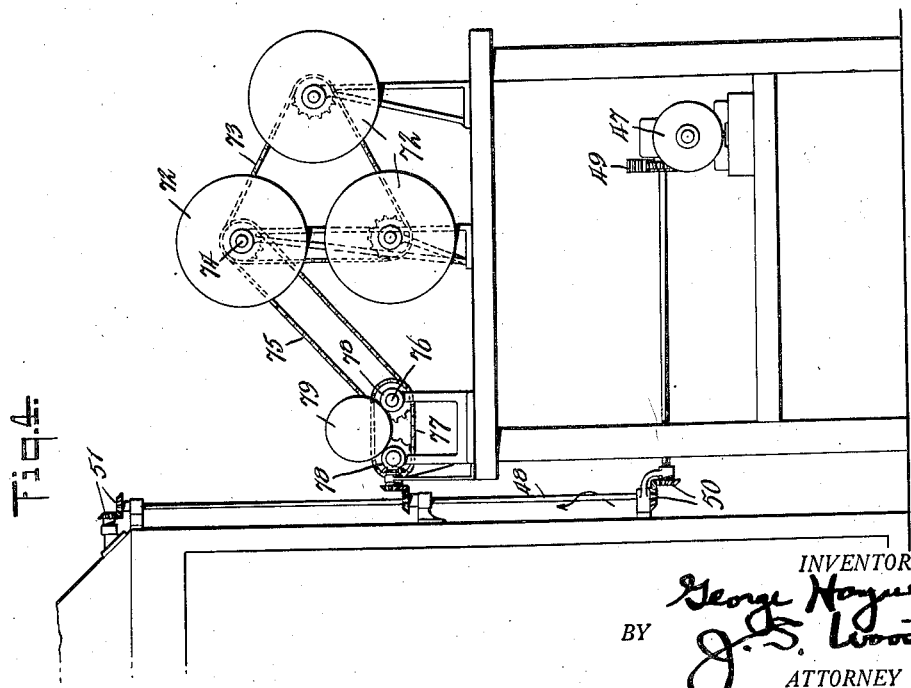

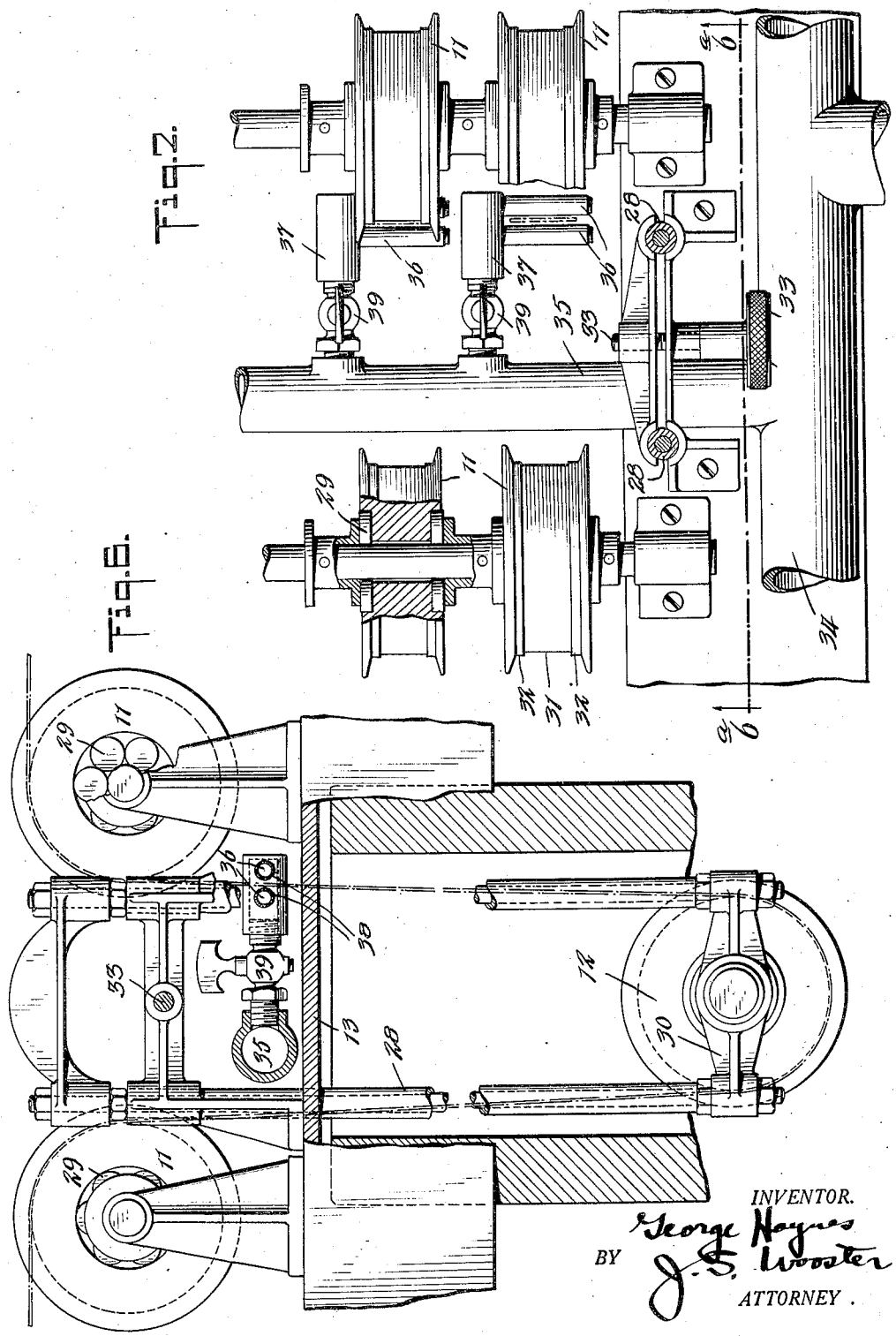

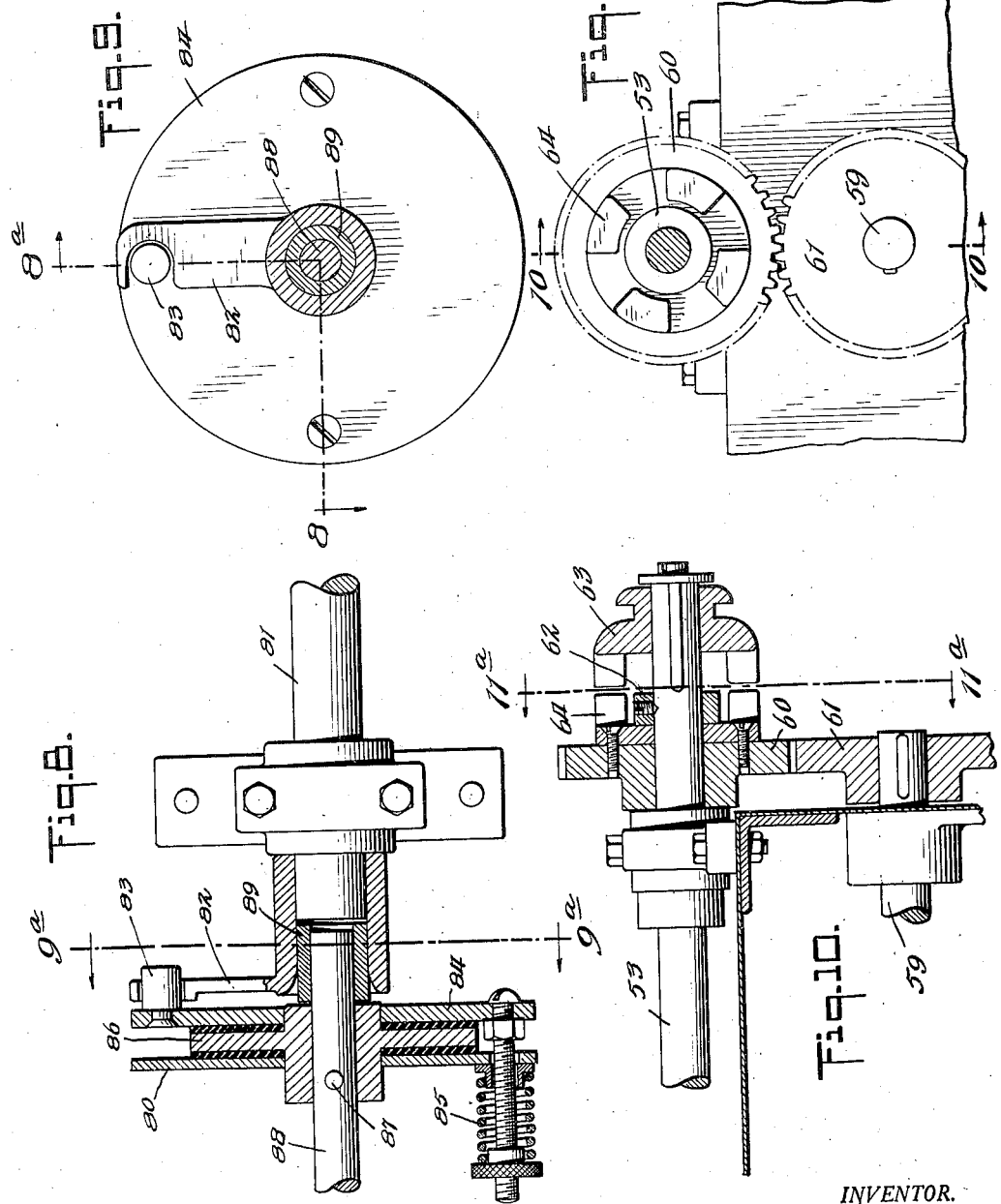

1,810,209

UNITED STATES PATENT OFFICE

GEORGE HAYNES, OF JERSEY CITY, NEW JERSEY, ASSIGNOR, BY MESNE ASSIGNMENTS, TO MAX B. DUPONT VITACOLOR CORPORATION, OF LOS ANGELES, CALIFORNIA, A CORPORATION OF DELAWARE

FILM TREATING MACHINE

Application filed January 4, 1926. Serial No. 79,144.

This invention relates to machines for treating long films such as are used in motion picture production, and has for its object to provide a machine of this type which operates on the film with less wear and tear and less likelihood of rupture from changes in length. A special object of the invention is to compensate for length changes in the film in any part of the machine. Another object is to provide a machine for treating a number of films at the same time, the machine being adjustable to compensate for length changes of any one or more films without affecting the rest through loss of time by stopping or slowing up these other films while the one or more films are being adjusted.

According to this invention a machine is provided for treating long films in the preparation, for example, of color motion pictures, by passing the films successively through a plurality of liquid tanks, and subsequently through a dryer casing. Instead of driving the film through the tanks by means of a series of driving pulleys, located in or on the tanks, I pull the film through the tanks by driving means disposed beyond the tanks, the film as it passes through the series of tanks passing over a plurality of upper and lower idler pulleys which guide it and permit its passage with a minimum of friction. The lower pulley in each tank can be adjusted to determine the length of travel of the film therethrough. From the tanks the film is pulled into the dryer casing by means such as pulleys which frictionally engage with it. In the dryer casing are also a plurality of idler pulleys over which the film moves in a tortuous path and beyond the casing is another pulling means frictionally engaging the film to pull it through the casing. Between the pairs of film engaging means are disposed a plurality of adjustable compensating pulleys which are preferably weighted to keep an even tension in the film even though it may expand or contract in passing through the tanks and the dryer. Means are associated with the driving or pulling devices to disconnect them from the source of power so that any one film can be stopped very readily without disturbing the passage of the others through the apparatus.

Referring to the drawings,

Fig. 1 is a longitudinal view partly in section of the entire film treating machine.

Fig. 2 is a top view of the device of Fig. 1 taken on the line 2a—2a of Fig. 1.

Fig. 3 is a section on the line 3a—3a of Fig. 1.

Fig. 4 is a side elevation of the rear portion of the machine showing the driving take-up mechanism.

Fig. 5 is a right end view of the machine and the device shown in Fig. 4.

Fig. 6 is a detailed view partly in section of the pulleys and their mountings over the liquid tanks.

Fig. 7 is a top plan view of the pulleys and their mountings.

Fig. 8 is a detailed view of the sliding clutch for driving each reel upon which the finished film is wound and is a section on the line 8a—8a of Fig. 9.

Fig. 9 is a section of the line 9a—9a of Fig. 8.

Fig. 10 is a detailed view of the clutch between the driving mechanism and the film engaging means in the second stage of the dryer casing, and is a section on the line 10—10 of Fig. 11.

Fig. 11 is a section on the line 11a—11a of Fig. 10.

Considering the drawings, in Fig. 1 the numeral 10 indicates a plurality of reels on which the film to be treated is wound, these reels being arranged in staggered relation as shown in Fig. 2 to economize space. From the reels 10, each film passes over idler pulleys 11 at the top of each liquid tank, and thence down under the idler pulleys 12 immersed within the liquids. Pulleys 11 and the pulleys 12 are all supported from a frame 13 suspended by cables 14 above the tanks and adapted to be raised until the pulleys 12 are entirely out of the liquids, or to be lowered to rest on the tanks and submerge the film the desired amount. Counterweights 15 are connected to cables 14 for raising and lowering the frame 13 by a winding drum 16 which is actuated by handle 17 through some slow motion connection such as a worm and a wheel, and the cables 18 wind or unwind upon the drum 16 adjusting the height of the counter weights and controlling the height of the frame 13 and its pulleys. The liquid tanks 19 to 27 are shown in Fig. 2 and in the preferred embodiment these tanks contain for example the following liquids: 19 water, 20 developer, 21 and 22 water, 23, 24 and 25 chemicals such as are used in the treatment of colored film during their production by the so-called single coated process for example, and 26 and 27 each contain water for washing the film. The number of tanks and their contents may be varied to suit the process.

As shown in Figs. 6 and 7, each of the pulleys 11 and 12 are provided with roller or ball bearings 29, these bearings and the pulleys having their outer surfaces of some non-corrosive and acid resistant material such as hard rubber or bakelite. The rods supporting the pulleys 12 from the frame 13 are likewise provided with a similar cover 28 of a non-corrosive and acid resisting material. The member 30 in which the shaft for the pulleys 12 are journaled is also preferably of such acid resisting material as bakelite, in order that no metal parts are exposed beneath the surfaces of the liquids and especially below the surface of any of the chemicals used in the liquid tanks. As shown in Figs. 7 each of the pulleys 11 and 12 have a recess portion 31 and ledges 32 at the sides, whereby the film in passing over the pulleys is supported by the ledges 32 and images on the film surface do not come in contact with the periphery of the pulleys but are spaced from the recess portion 31. Pulleys 12 within any one of the liquid tanks are adjustable relatively to the frame 13 and to the level of the liquid independently of the submersion of the pulleys 12 in the other tanks by adjustment of the clamping screw 33 which enables pulleys 12 in any one tank to be raised or lowered and clamped at the desired height as shown. A supply pipe for compressed air 34 leads into the pipe 35 from which are led off branches for each film. These comprise pipes 36 threaded into the connection 37 and controlled by the valve 39. Between each of the small pipes 36 is passed the film rising from the liquid tank and each of these small pipes 36 have air holes 38 provided on its side adjacent the film as shown in Fig. 6, so that the jets of air or gas blow back any surplus liquid carried by the film and therefore prevent an excess of liquid being carried by the film into the next adjacent tank or into the dryer. If desired, this method of removing excess liquid may be used for each film as it passes out of each liquid tank.

As shown in Fig. 2 all of these liquid tanks except the first, #19, are arranged in a larger tank 40 provided with supply and outlet connections 41 and 44 respectively, and baffle plates are provided within this large tank in order to cause the water to circulate around the several liquid tanks in the manner shown by the arrows, for example. The valves 42 and 43 control the supplying of cooling liquid and either or both of these valves may be open in order to obtain the circulation desired, and to control the temperature of the water around the chemical tanks the valve 43 is provided to supply additional cool water when needed.

After passing successively through the liquid tanks, the film moves over the positively driven pulleys 45. These pulleys are driven through shaft 46 and the bevel gears illustrated in Fig. 2 from one of the shafts 53. As shown in Figs. 4 and 5, the motor 47 drives the upwardly extending shaft 48 through the reducing gears 49 and the bevel gears 50 at the lower end and 51 at the upper end, thence driving the shaft 52 extending along the upper part of the dryer casing and in turn driving the shafts 53. Each of these shafts 53 is provided on its outer end with a clutch part 63 engaging a co-operating clutch 64 secured to the gear 60 and engaging the gear 61 keyed on the shafts 59 extending in through the upper portion of the enclosing casing in the second stage of the dryer. The clutch member 64 is free to rotate on the shaft 53 and held in place by the ring 62 secured to the shaft. From the pulley 45 the film passes under one of the weighted pulleys 54 shown in Fig. 3 as being provided with rollers at the sides to move up and down between the vertical guide ways for the purpose of compensating for any length changes in the film and to maintain an even tension on the film. The films next pass over idler pulleys 55 and thence into the enclosing casing 56 of the dryer where each film passes around one of the upper drive pulleys 57 then one of the lower idler pulleys 58, pulleys 58 being stationary with respect to the casing, and then over another drive pulley 57 on the same shaft 59 until preferably three turns, or enough, are provided to cause the friction engagement of the positively driven pulleys 57 to pull the film through all of the liquid tanks with the assistance also of the positively driven pulley 45. After leaving the positively driven pulleys 57, the films pass through the openings 65 shown in Fig. 3 in the walls between the first and second stages of the dryer casings, and thence over the idler pulleys 67 which are free and preferably possessing little friction as was the case with the free pulleys 11 and 12 used with the tanks. In this first portion of the dryer, the films pass under the lower compensating pulleys 66 shown in Fig. 1 and these, like the pulleys 54, are weighted and free to move up and down along guide-ways, whereby, if shrinkage occurs in the film it causes these lower pulleys to rise. Each film after passing under the lower pulleys then goes over the upper pulleys 67 again and down again until the travel of the film is sufficient to have it completely dried by the heated air passed into the first stage of the dryer through the pipe 69 through the holes 70 in the roof of the dryer casing, thence through the opening shown in Fig. 1 in the lower portion of the wall separating the first and second stages of the dryer, thence up through the second stage of section 56 and out through the discharge pipe 71. After passing the pulleys 66 and 67, the film is next pulled out the openings 68 in the casing (see Fig. 3) and wound upon reels 72. The opening 68 may have guide rollers positioned by the casing wall in order to prevent the film from touching the sides of the opening. The same is true of the opening 65.

The winding mechanism for the films from the dryer includes the flexible belt or chain 73 driving each of the six reels illustrated from the shaft 74 which in turn is driven by the chain 75 from the shaft 76 shown in Figs. 2 and 4. The reels 72 are mounted in the spaced relation illustrated in order to provide room for the driving mechanism of each reel. Another chain or belt 77 drives the pulleys 78 shown in Fig. 4 and over which the film is moved. A removable roller 79 is weighted, or is sufficiently heavy, to keep the film in contact with the pulleys 78 and cause the same to be pulled through the dryer casing. The film reels 72 are keyed or rotatable with their driving shafts but readily removable over the end of the shaft. Driving each winding reel 72 is a slipping clutch 80 driven by the member 81 which rotates faster than the reel. Driving member 81 provided with a projection 82 engaging the pin 83 in the clutch member 84 is shown in Figs. 8 and 9.

Springs 85 keep the two plates of the clutch member pressed together upon the driven disc 86 which is secured to the reel shaft 88 by the pin 87 or other securing means. As the driving member 81 rotates more rapidly than the reel, there is a constant slipping between the disc 86 and the clutch plates on either side of it so that a continual tension is placed upon the film. Inasmuch as the film is fed through the dryer at a substantially constant rate depending on the speed of the driving pulleys 57 and 45, the reels 72 might be driven at a predetermined speed were it not for the uncertain factor of shrinkage, which may be more at certain times than others. In order to assist in pulling the film through the dryer and in order to keep the tension of the film continuous, and substantially constant upon the winding reel, the slipping clutch is provided.

In operation, the films to be treated are placed upon the reels 10 and the requisite treating liquids placed in the tanks when the frame 13 is lowered to substantially the top of the tanks. If further adjustment of the time of immersion of the films in any particular tank is desired, the height of the lower idler pulleys 12 can be adjusted by the knurled head 33 of the clamping screw. Valves 42 and 43 are adjusted to give the necessary water circulation about the treating tanks. To avoid the necessity of threading the film through the various pulleys, a blank film is usually kept in the machine when no film is being treated so that by merely attaching a film to the end of the blank film it can be pulled through without any great trouble. The pulleys 11 and 12 are sufficiently large and constructed of roller or ball bearings so as to have sufficiently little friction to permit the entire film to be pulled through the tanks by driving pulleys 45 and 57. The weighted pulleys 54 compensate for any elongation or length changes in the treating tanks. Pulling the film through all the treating tanks is of special advantage in insuring constant tension to be kept on the film in all parts which would not be true if certain of the pulleys 11 or 12 were positively actuated because then the film would become elongated in certain places and possibly cause damage through twisting or working off the pulleys. After being moved through the second stage of the dryer by the positively actuated pulleys 57 the film passes over the idler pulleys 67 and 66 in the first stage of the dryer, and then is pulled through this first stage of the dryer by the positively driven frictionally engaging pulleys 78. The film is then wound upon some one of the reels 72. For purposes of illustrating this film treating machine, the machine has been shown for handling six films, but it will be understood that any number may be handled as desired. To insure more uniform temperature in the dryer, it will be seen from Figs. 2 and 3 that a longitudinal wall divides the casings so that only three films are treated on each side when a total of six films are to be handled. If the elongation of the film in the tanks has been excessive, it is only necessary to stop the particular film in which the elongation has been large by raising the film from the positively driven pulley 45 onto the idler pulley 90 located above it as shown in Fig. 1. Then the clutch part 63 controlling that particular film is moved to stop the driving of that film through the dryer. The weighted roller 79 controlling the same film is next taken off the spaced pulleys 78 so that the film is then no longer moved but stops so that the height of the adjustable pulley 54 can be changed and any undue length changes compensated for. In the same way in case of undue shrinkage on the dryer of any one film, idler pulleys 66 can be adjusted in height to correct such shrinkage on stopping of that particular film. When one film is stopped the reel 72 may be left on its shaft, in which case the clutch 80 slips completely as the reel will not then be driven, or if the film is to be stopped for a considerable length of time the reel 72 may be withdrawn off the end of its shaft and so save wear in the slipping clutch 80. The weighted roller 79 when removed is equivalent to a clutch in stopping the driving or pulling of the film through the dryer. The film can be taken off the pulley 45 and put on the idler pulley 90 by hand. The tanks illustrated are for use in the second operation in the making of color motion pictures by the so-called single coated process, which comprises, developing, washing, bleaching, washing, fixing, washing, and drying. However, it will be understood that the number of tanks is not limited to what is shown, but this invention is also applicable to other processes and to other operations in making of such films. For example, materials are used in the first operation of treating films under a single coated process which includes developing, washing, toning, washing, and drying, or in the last operation, which includes, washing, bleaching, dyeing, and drying. This invention, it will be seen, is also adapted for use with many other processes by varying the number of tanks and their contents.

Among the advantages of this invention may be mentioned the increased life to the film since there is lessened wear through the absence of any sprocket pins engaging the perforations on the edges of the film. While the film is frictionally driven, it is driven in such a manner that there is a continual tension upon the film in all parts of the machine. This invention is especially advantageous in the production of color pictures, since the shrinkage will be more nearly uniform in the drying, thereby facilitating the accurate superposing of the second image. One feature contributing to this result is the provision of means for pulling the film through all the tanks and without the necessity of driving the film through any of the tanks. Wherever there is a pulley which drives or tends to push the film through the liquid tank, any elongation occurring beyond such driving or pushing pulley would, if cumulative, cause the film to become too loose in that part of the machine, and possibly twist and come off one of the guide pulleys. Having the film driven or pulled entirely through the tanks obviates any such danger. In order to achieve this desirable result of insuring considerable tension on all parts of the film and enabling it to be pulled entirely through the tanks, the pulleys in this invention are made large enough in size and of sufficiently little friction so that the sum of the friction in all pulleys touching any one film does not endanger tearing or breaking the film. In the dryer, for example, the frictional engagement of the film is also maintained and provision is here again made to compensate for any length changes in the film. In this invention any one film can be stopped and adjusted without stopping or affecting operation of any of the other films being treated. Having the frictional engaging means for pulling the film through all the tanks located partly within the dryer enables the feed from the tanks to the dryer to be maintained at the right amount. If it is desired to change the chemicals and clean tanks all the pulleys 11 and 12 may be raised by raising their frame on operation of the winding drum 16 through the handle 17.

There is much less danger of breakage and less wear and tear on the film than in any other film treating machine heretofore devised.

I claim:

1. A machine for treating long films, comprising a series of tanks, means for passing the film successively through said tanks without substantial friction, means beyond the tanks engaging the film to pull it through the tanks, a casing beyond said tanks through which said film passes, means within said casing engaging the film to pull the film into said casing, and means beyond the casing engaging the film to pull the film through said casing.

2. A machine for treating long films, comprising a series of tanks, means for passing the film successively through said tanks without substantial friction, means beyond the tanks engaging the film to pull it through the tanks, a casing beyond said tanks through which said film passes, means within said casing engaging the film to pull the film into said casing, means beyond the casing engaging the film to pull the film through said casing, and adjustable tension compensating means, disposed between the pairs of film engaging and pulling means to compensate for variation in film length.

3. A machine for treating long films, comprising a series of tanks, means for passing the film successively through said tanks without substantial friction, means beyond the tanks engaging the film to pull it through the tanks, a casing beyond said tanks through which said film passes, means within said casing engaging the film to pull the film into said casing, means beyond the casing engaging the film to pull the film through said casing, adjustable tension compensation means, disposed between the pairs of film engaging and pulling means to compensate for variation in film length, means for driving said film engaging and pulling means, and means for disconnecting said pulling means from the driving means whereby the movement of the film can be stopped at will.

4. A machine for treating long films, comprising a series of tanks, a plurality of idler pulleys therein for guiding the film in its passage successively through said tanks, driving pulleys beyond the tanks engaging the film to pull the film through the tanks, a second set of driving pulleys beyond the first set frictionally engaging the film to pull it onward, and adjustable compensating pulleys engaging the film between the first and second sets of driving pulleys to maintain an even tension in the film and to allow for change in film length.

5. A machine for treating long films, comprising a series of tanks, a plurality of idler pulleys therein to guide the film without substantial friction in its passage through the tanks, driving pulleys beyond the tanks, engaging the film to pull it through said tanks, a casing through which said film is passed after it leaves the tanks, a second set of driving pulleys within the casing engaging the film to pull it into the casing, and adjustable compensating pulleys between the first and second set of driving pulleys to maintain an even tension in the film and to allow for change in film length.

6. A machine for treating long films, comprising a series of tanks, a plurality of idler pulleys therein to guide the film without substantial friction in its passage through the tanks, driving pulleys beyond the tanks, engaging the film to pull it through said tanks, a casing through which said film is passed after it leaves the tanks, a second set of driving pulleys within the casing engaging the film to pull it into the casing, adjustable compensating pulleys between the first and second set of driving pulleys to maintain an even tension in the film and to allow for change in film length, and a third set of driving pulleys beyond the casing engaging the film to pull it through the casing.

7. A machine for treating long films, comprising a series of tanks, a plurality of idler pulleys therein to guide the film without substantial friction in its passage through the tanks, driving pulleys beyond the tanks, engaging the film to pull it through said tanks, a casing through which said film is passed after it leaves the tanks, a second set of driving pulleys within the casing engaging the film to pull it into the casing, adjustable compensating pulleys between the first and second set of driving pulleys to maintain an even tension in the film and to allow for change in film length, a third set of driving pulleys beyond the casing engaging the film to pull it through the casing, and adjustable compensating pulleys engaging the film between the second and third sets of driving pulleys to maintain an even tension in the film and allow for change in film length.

8. A machine for treating long films, comprising means for guiding the film through the machine without substantial friction, means frictionally engaging the film for pulling it through the machine, means for winding said film after treatment, a member for driving said film winding means at a speed greater than that of said film pulling means, and a slipping clutch connected between said winding means and said member, whereby a substantially constant tension is maintained on said film.

9. A machine for treating long films, comprising means for guiding the film through the machine without substantial friction, means within the machine for maintaining a continuous tension on the film and for compensating for length changes therein, means frictionally engaging the film to pull it through the machine, said film pulling means comprising a pair of spaced driven pulleys, and a removable roller supported on and between said pulleys and of a weight sufficient to cause the film to be frictionally engaged and driven by said pulleys.

Signed at Jersey City in the county of Hudson and State of New Jersey this 30th day of December A. D. 1925.

GEORGE HAYNES.